Patented Dec. 12, 1933

1,938,651

UNITED STATES PATENT OFFICE 1,938,651

VULCANIZATION OF RUBBER

Ira Williams, Woodstown, N. J., assignor to E. I. du Pont de Nemours & Company, Wilmington, Del., a corporation of Delaware No Drawing. Application February 25, 1932
Serial No. 595,229

24 Claims. (Cl. 18—53)

This invention relates to the vulcanization of rubber and more particularly to new accelerators therefor.

Previous attempts have been made to vulcanize a rubber mix by immersing it in hot water containing an accelerator. Attempts have also been made to vulcanize latex without the coagulation thereof, by treatment with an accelerator and heat. While such attempts have met with a measure of success they have not been as successful as desired apparently by reason of a suitable accelerator not having discovered. The vulcanization of rubber and latex, under such conditions, requires an accelerator which is not only stable and soluble in hot water but one which is soluble in rubber and will quickly penetrate into the rubber to an appreciable extent so that a uniform cure may result.

An object of this invention is to provide a new class of accelerators. Another object is to provide a class of accelerators which are stable and water soluble and which are also soluble in rubber. A further object is to provide water and rubber soluble accelerators which are sufficiently active to produce vulcanization at low temperatures. A still further object is to provide an improved method of vulcanizing rubber and latex. Other and further objects are to produce a new composition of matter and to advance the art.

These objects are accomplished by the following invention which comprises vulcanizing rubber by treating it with an aqueous or alcoholic solution of members of a class of dialkyl-dithiocarbamates and heat. While the sodium salts of the dithiocarbamates prepared from dimethyl, diethyl, di-isopropyl, and other similar amines are known it has been found that they are very weak and commercially undesirable accelerators, probably due to their low solubility in rubber.

I have made the important discovery that by increasing the length of the hydrocarbon chain attached to the nitrogen in these types of compounds their accelerating properties and solubility in rubber are very materially increased without decreasing their solubility in water to any appreciable extent.

The compounds which constitute the accelerators of my invention may be represented by the formula:

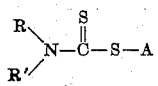

in which both R and R' represent aliphatic radicals at least one of which contains a straight chain of four or more carbon atoms and A represents an alkali metal such as sodium or potassium. Some of the compounds of this class which I have found to be particularly effective are sodium dibutyl-dithiocarbamate, potassium dibutyl-dithiocarbamate, and sodium diheptyl-dithiocarbamate.

The preferred method of vulcanizing with these compounds comprises treating a rubber stock with a hot aqueous solution of one or more members of the class or by adding the compound to latex and then heating. When added to latex the compound is dissolved by the water in the latex. Instead of water, alcohols such as methyl alcohol, ethyl alcohol, glycols or glycerine or similar solvents which are not solvents for rubber may be employed for placing the accelerator in solution.

To illustrate the preferred methods of vulcanizing with these compounds and the results of their use the following examples are given:

Example 1.—An unvulcanized rubber stock comprising 100 parts rubber, 2 parts sulfur, and 5 parts zinc oxide, after being calendared into a thin sheet, was suspended in a 0.5% solution of sodium dibutyl-dithiocarbamate at 98° C., for 20 minutes. At the end of this time the rubber was fully vulcanized.

Example 2.—A rubber stock of the same composition as that of example 1 was calendared into a thin sheet which was suspended in an 0.5% solution of sodium diheptyl-dithiocarbamate at a temperature of 98° C. for 20 minutes. This treatment effected a complete vulcanization of the rubber.

Example 3.—To one liter of latex having a 30% rubber content was added 3 grams of potassium dibutyl-dithiocarbamate, 6 grams of colloidal sulfur, and 9 grams of colloidal zinc oxide. This mixture was placed in a sealed container wherein it was heated to 100° C. for 60 minutes. The resulting composition was evaporated to form films of rubber. Examination and tests of these films disclosed that the latex was well vulcanized.

Some of the other important compounds falling within this class are:
Sodium dipentyl-dithiocarbamate.
Sodium dihexyl-dithiocarbamate.
Sodium butyl-hexyl-dithiocarbamate.
Sodium butyl-heptyl-dithiocarbamate.
Sodium heptyl-5-dimethyl-hexyl-dithiocarbamate.
The potassium salts of these compounds as well as their higher homologues may also be mentioned.

While the specific method employed for forming the compounds of my invention is unimportant as many methods are known to those skilled in the art, a method which I have found to be satisfactory comprises dissolving caustic alkali in excess of water, adding carbon disulfide to the resulting solution and then slowly stirring in a dialkyl amine with cooling. The resulting alkali salt of the dialkyl dithiocarbamate may be recovered from the solution in any desired manner but preferably by evaporating under vacuum.

As a specific illustration of this method, the preparation of sodium dibutyl-dithiocarbamate may be given as follows: 40 grams of sodium hydroxide are dissolved in 300 grams of water; carbon disulfide to the extent of 76 grams is then added to the alkali solution; to the resulting solution 126 grams of dibutyl amine are slowly added with constant stirring. Since this reaction is exothermic, cooling must be resorted to during the admission of the dibutyl amine to prevent the temperature from rising to an objectionable degree. When the reaction is complete the solution is evaporated under a vacuum and the solid salt of sodium dibutyl dithiocarbamate is recovered. This salt may be purified by dissolving it in twice its weight of benzene and then adding ten times its weight of gasoline to precipitate the salt in the form of flat white scales, melting at 42° C. This salt is quite soluble in water, alcohol, acetone, ether, benzene, carbon disulfide, ethylene chloride, and most other organic solvents. The other members of this class of alkali salts of dialkyl dithiocarbamates may be prepared in the same manner with changes in the amounts of caustic alkali, water and carbon disulfide to obtain the reacting compounds in substantially the same molecular proportions.

While I have disclosed certain specific compounds and certain specific methods of employing the same, it is to be understood that such specific compounds and methods are given merely by way of illustration and many modifications and changes therein will appear to those skilled in the art, without departing from the spirit of my invention. Accordingly the scope of my invention is to be limited solely by the appended claims, construed as broadly as is permissible in view of the prior art.

I claim:

1. Rubber containing as a vulcanization accelerator a compound having the formula:

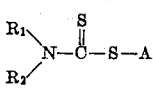

in which $R_1$ and $R_2$ each represents an alkyl group at least one of which contains a straight chain of at least four carbon atoms and A represents an alkali metal.

2. Rubber containing as a vulcanization accelerator a compound having the formula:

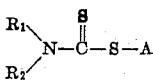

in which $R_1$ and $R_2$ represent identical alkyl groups each containing a straight chain of at least four carbon atoms and A represents an alkali metal.

3. Rubber containing as a vulcanization accelerator a compound having the formula:

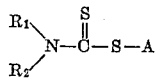

in which $R_1$ and $R_2$ represent different alkyl groups at least one of which contains a straight chain of at least four carbon atoms and A represents an alkali metal.

4. In the process of vulcanizing rubber the step which comprises treating a rubber stock, in the presence of water and heat, with a compound having the formula:

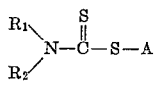

in which $R_1$ and $R_2$ each represents an alkyl group at least one of which contains a straight chain of at least four carbon atoms and A represents an alkali metal.

5. In the process of vulcanizing rubber the step which comprises treating the rubber, in the presence of water and heat, with a compound having the formula:

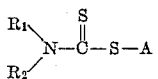

in which $R_1$ and $R_2$ each represents an alkyl groups each of which contains a straight chain of at least four carbon atoms and A represents an alkali metal.

6. In the process of vulcanizing rubber the step which comprises treating the rubber, in the presence of water and heat, with a compound having the formula:

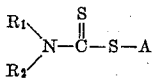

in which $R_1$ and $R_2$ represent different alkyl groups, at least one of which contains a straight chain of at least four carbon atoms and A represents an alkali metal.

7. The process of vulcanizing the rubber in latex which comprises mixing the latex with vulcanizing materials and a small amount of a compound having the formula:

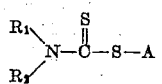

in which $R_1$ and $R_2$ each represents an alkyl group at least one of which contains a straight chain of at least four carbon atoms and A represents an alkali metal.

8. The process of vulcanizing the rubber in latex which comprises mixing the latex with vulcanizing materials and a small amount of a compound having the formula:

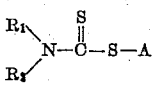

in which $R_1$ and $R_2$ represent identical alkyl groups each of which contains a straight chain of at least four carbon atoms and A represents an alkali metal, and then subjecting the mixture to heat.

9. The process of vulcanizing the rubber in latex which comprises mixing the latex with vulcanizing materials and a small amount of a compound having the formula:

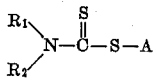

in which $R_1$ and $R_2$ represent different alkyl groups at least one of which contains a straight chain of at least four carbon atoms and A represents an alkali metal, and then subjecting the mixture to heat.

10. Rubber having incorporated therein as a vulcanization accelerator sodium dibutyl-dithiocarbamate.

11. In the process of vulcanizing rubber, the step which comprises treating a rubber stock, in the presence of water and heat, with sodium dibutyl-dithiocarbamate.

12. The process of vulcanizing the rubber in latex which comprises mixing the latex with vulcanizing materials and a small amount of sodium dibutyl-dithiocarbamate, and then subjecting the mixture to heat.

13. The process of vulcanizing rubber which comprises treating a rubber stock with a hot aqueous solution of a compound having the formula:

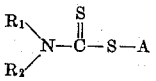

in which $R_1$ and $R_2$ each represents an alkyl group at least one of which contains a straight chain of at least four carbon atoms and A represents an alkali metal.

14. The process of vulcanizing rubber which comprises treating a rubber stock with a hot aqueous solution of a compound having the formula:

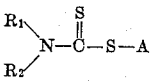

in which $R_1$ and $R_2$ represent identical alkyl groups each containing a straight chain of at least four carbon atoms and A represents an alkali metal.

15. The process of vulcanizing rubber which comprises treating a rubber stock with a hot aqueous solution of a compound having the formula:

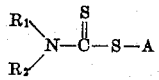

in which $R_1$ and $R_2$ represent different alkyl groups at least one of which contains a straight chain of at least four carbon atoms and A represents an alkali metal.

16. The process of vulcanizing rubber which comprises treating a rubber stock with a hot aqueous solution of sodium dibutyl-dithiocarbamate.

17. Rubber having incorporated therein as a vulcanization accelerator sodium diheptyl-dithiocarbamate.

18. In the process of vulcanizing rubber, the step which comprises treating a rubber stock, in the presence of water and heat, with sodium diheptyl-dithiocarbamate.

19. The process of vulcanizing the rubber in latex which comprises mixing the latex with vulcanizing materials and a small amount of sodium diheptyl-dithiocarbamate and then subjecting the mixture to heat.

20. The process of vulcanizing rubber which comprises treating a rubber stock with a hot aqueous solution of sodium diheptyl-dithiocarbamate.

21. Rubber having incorporated therein as a vulcanization accelerator potassium dibutyl-dithiocarbamate.

22. In the process of vulcanizing rubber, the step which comprises treating a rubber stock, in the presence of water and heat, with potassium dibutyl-dithiocarbamate.

23. The process of vulcanizing the rubber in latex which comprises mixing the latex with vulcanizing materials and a small amount of potassium dibutyl-dithiocarbamate and then subjecting the mixture to heat.

24. The process of vulcanizing rubber which comprises treating a rubber stock with a hot aqueous solution of potassium dibutyl-dithiocarbamate.

IRA WILLIAMS.